United States Patent
Tang et al.

(10) Patent No.: US 7,493,128 B2
(45) Date of Patent: Feb. 17, 2009

(54) MANAGING A COMMUNICATION DEVICE VIA GPRS AND A GSM CONNECTION

(75) Inventors: Vicau Tang, Sucy en Brie (FR); Nagy Korkmaz, Corbevoie (FR)

(73) Assignee: Axalto SA, Montrouge Cedex (FR)

(*) Notice: Subject to any disclaimer, the term of this patent is extended or adjusted under 35 U.S.C. 154(b) by 168 days.

(21) Appl. No.: 10/517,114

(22) PCT Filed: Jun. 4, 2003

(86) PCT No.: PCT/IB03/02437

§ 371 (c)(1),
(2), (4) Date: Dec. 3, 2004

(87) PCT Pub. No.: WO03/105419

PCT Pub. Date: Dec. 18, 2003

(65) Prior Publication Data

US 2005/0223105 A1    Oct. 6, 2005

(30) Foreign Application Priority Data

Jun. 5, 2002 (EP) .................................. 02291389

(51) Int. Cl.
*H04Q 7/20* (2006.01)
(52) U.S. Cl. .................... 455/466; 455/425; 455/426.1; 455/452.1
(58) Field of Classification Search ............... 455/424, 455/425, 452.1, 456.5, 456.6, 426, 456.4, 455/466, 426.1
See application file for complete search history.

(56) References Cited

U.S. PATENT DOCUMENTS

| 6,047,194 | A | 4/2000 | Andersson |
|---|---|---|---|
| 7,215,947 | B2* | 5/2007 | Dowling et al. ........... 455/414.2 |
| 2001/0015977 | A1* | 8/2001 | Johansson .................... 370/392 |
| 2002/0077134 | A1* | 6/2002 | Mizell et al. ................. 455/466 |
| 2002/0110116 | A1* | 8/2002 | Aaltonen ..................... 370/352 |
| 2002/0131397 | A1* | 9/2002 | Patel et al. ................... 370/349 |
| 2002/0183045 | A1* | 12/2002 | Emmerson et al. .......... 455/412 |
| 2003/0096619 | A1* | 5/2003 | Winberg ...................... 455/453 |
| 2003/0128822 | A1* | 7/2003 | Leivo et al. .............. 379/93.02 |
| 2004/0010579 | A1* | 1/2004 | Freese ......................... 709/223 |
| 2004/0166843 | A1* | 8/2004 | Hahn ...................... 455/426.2 |
| 2005/0043020 | A1* | 2/2005 | Lipsanen et al. .......... 455/422.1 |

OTHER PUBLICATIONS

P. Rysavy; "Paper: General Packet Radio Services (GPRS)"; PCS Data Today, dated Sep. 30, 2998.

* cited by examiner

*Primary Examiner*—Tuan A Pham
(74) *Attorney, Agent, or Firm*—Osha • Liang LLP

(57) ABSTRACT

A Method of managing a communication device (MP) being arranged to communicate with a server(SERV) via a first communication network (GSMNET) and a second communication network (IPNET) is characterized in that the method comprises the following step: an instruction step, in which the server (SERV) sends a management-request instruction to the communication device (MP) via the first communication network and; an executing step, in which the communication device (MP) executes the management-request instruction which causes the communication device (MP) to request the server (SERV) to effect an operation in the communication device (MP) via the second communication network (IPNET).

9 Claims, 2 Drawing Sheets

MANAGING A COMMUNICATION DEVICE VIA GPRS AND A GSM CONNECTION

FIELD OF THE INVENTION

The invention relates to managing a communication device being arranged to communicate with a server. The communication device may be, for example, a subscriber identity module (SIM) which is present in a mobile phone.

BACKGROUND OF THE INVENTION

In a GSM network, SMS (Short Messages Service) messages can be used to load data or applications from a remote content server into a SIM card that is inserted in a mobile phone. This can be done on the initiative of the remote content server. This is possible because the mobile phone is listening for incoming SMS messages.

US 2001/0015977 discloses a system comprising a push server, a Short Message Service Center (SMS-C), a wireless communication station and a Domain Name Server (DNS). The push server causes the SMS-C to send to the wireless communication station a SMS via a GSM or GPRS channel. The SMS comprises the IP address and a port number of the push server. Then the wireless communication station sends the IP address to the DNS server. The DNS server send back to the wireless communication station the corresponding server host name. The server host name is then displayed on the wireless communication station. The user has to decide whether or not he wants to receive data from the push server. If the user inputs "yes" the process then continues in a GPRS connection phase. The push server then starts transmitting data to the GPRS station.

SUMMARY OF THE INVENTION

It is an object of the invention to manage a communication device more efficiently.

According to one aspect of the invention, a method of managing a communication device being arranged to communicate with a server via a first communication network and a second communication network is characterised in that the method comprises the following steps:
  an instruction step, in which the server sends a management-request instruction to the communication device via the first communication network and;
  an executing step, in which the communication device executes the management-request instruction which causes the communication device to request the server to effect an operation in the communication device via the second communication network.

The first communication network may be, for example, a GSM network. The second communication network may be, for example, a GPRS (General Packet Radio Service) network. The communication device may be, for example, a mobile phone in which a SIM card is inserted.

The GSM network enables the server, at its own initiative, to send SMS messages to several mobile phones simultaneously. The GSM network thus enables to diffuse instructions.

Certain mobile phones can communicate via a GPRS network and a GSM network. Generally, a GPRS network does not allow a diffusion of instructions. What is more, a communication via a GPRS network can be established only on the initiative of the mobile phone and not on that of the server. The reason for this is that the GPRS network is based on the Internet Protocol (IP). However a GPRS network generally has a relatively wide bandwidth, which allows a fast transfer of data. The same applies to other types of networks that are IP based like, for example, a Universal Mobile Telecommunication System (UMPS) network.

In accordance with the invention, the server uses the GSM network to diffuse a management-request instruction rather than the management instruction itself. The management-request instruction causes the mobile phone, or the SIM card inserted therein, to automatically request the server to send him one or more management instructions via the GPRS network, or a similar network. Thus, the mobile phone or the SIM card inserted therein is managed via the GPRS network which has a relatively wide bandwidth. Consequently, the mobile phone, or the SIM card inserted therein, can be managed in a relatively short time. Contrary to US 2001/0015977, there is no intervention of a user. Thanks to the invention telecom operators can thus perform campaigns also in a GPRS context. Consequently the invention allows a more efficient management of communication devices.

DETAILED DESCRIPTION

Figure 1:
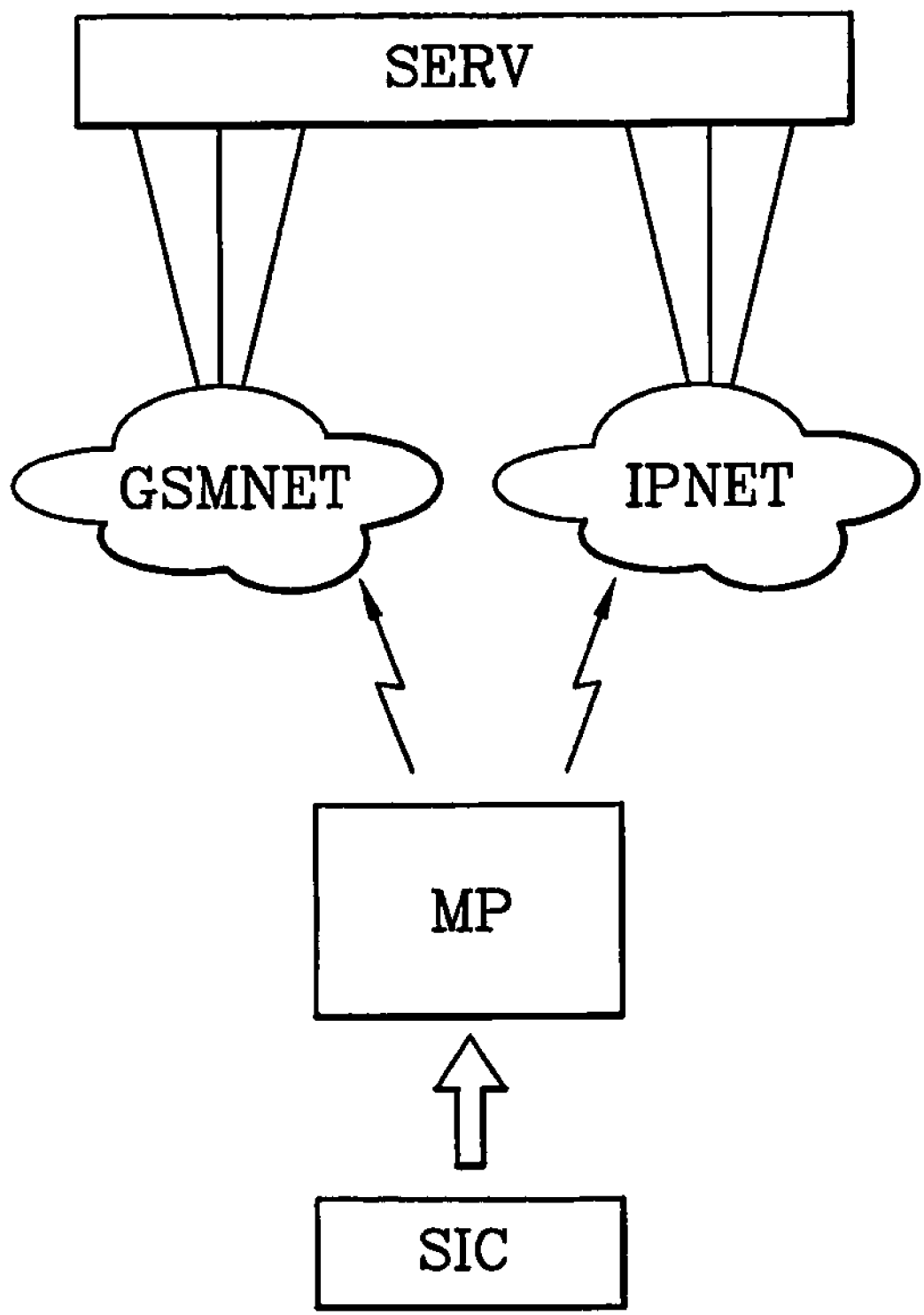
FIG. 1 illustrates a wireless network system.

FIG. 1 illustrates a wireless network system. The wireless network system includes a SIM card SIC to be inserted in a mobile phone MP.

The mobile phone MP is arranged to communicate with a content server SERV via a GSM network GSMNET and a GPRS (General Packet Radio Service) based network IPNET. A GPRS based network generally has a higher-speed data transfer than that of a GSM network GSMNET.

The content server SERV may comprise data or various applications to be loaded into the SIM card SIC. These applications or data can be loaded via one or several ports of the server SERV. The data or application can be loaded on a per-SIM card mode or on a campaign basis. In the latter case, the server SERV loads data into a group of SIM cards (SIC). It is somewhat like a "broadcast" update.

The mobile phone MP can receive SMS messages from the content server SERV via the GSM network GSMNET.

The mobile phone MP is listening to the GSM network GSMNET for incoming SMS (Short Message Service) messages.

Figure 2:
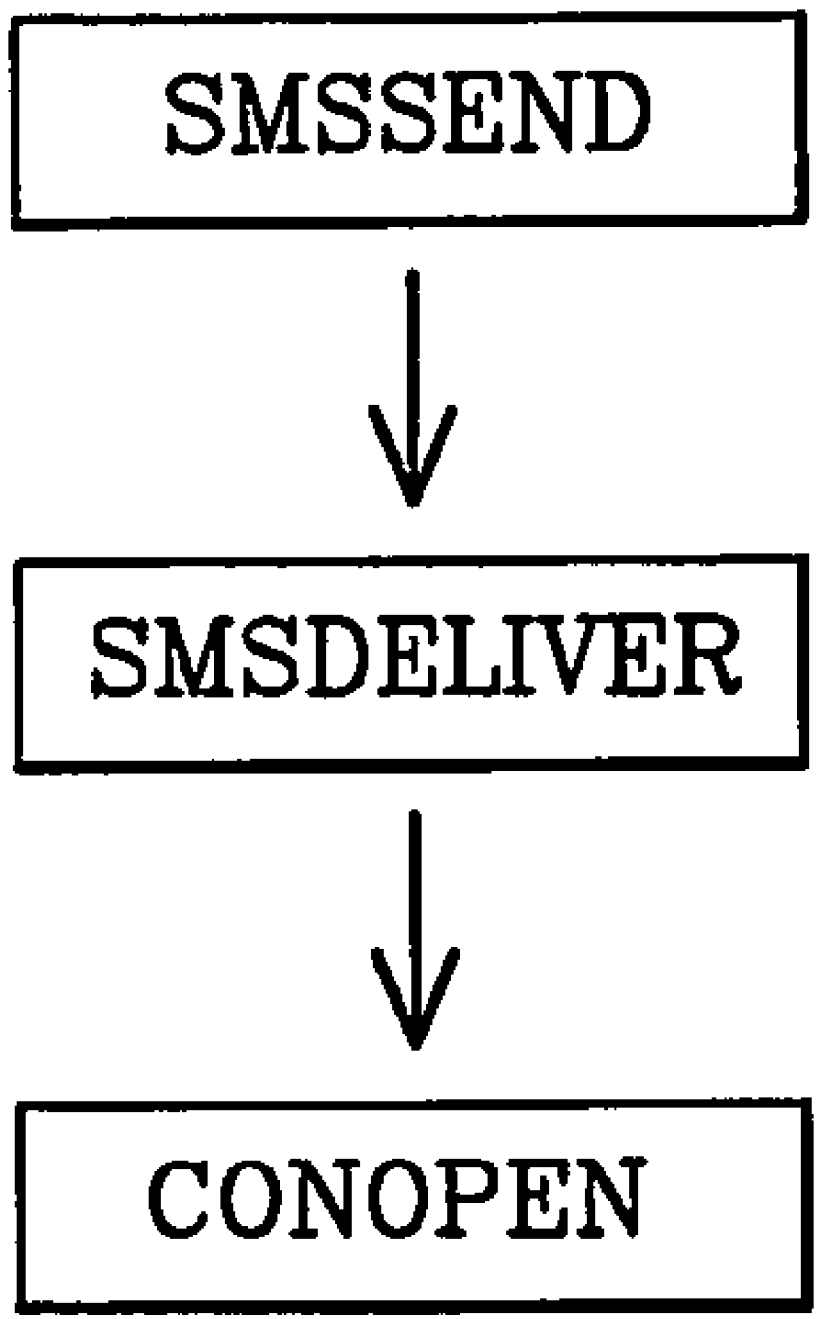
FIG. 2 illustrates a method of establishing a connection between a mobile phone and a content server via a GPRS network.

FIG. 2 illustrates a method of establishing a connection between the mobile phone MP and the content server SERV via the GPRS network.

In an SMS sending step SMSSEND, the content server SERV sends an SMS message via the GSM network GSMNET to the mobile phone MP. The SMS message comprises instructions defining a request for opening a connection between the mobile phone MP and the content server SERV via the GPRS based network IPNET. The SMS message may also comprise a destination data defining the address of the content server SERV and a data defining the specific port of the server SERV, for example, the port number PORTNUM. Advantageously, the SMS can be encrypted using a security protocol as defined, for example, in the ETSI GSM 3.48 standard.

In an SMS delivering step SMSDELIVER, the mobile phone MP delivers the SMS message to the SIM card SIC. The SIM card SIC contains a software which can analyse and understand the instructions and data contained in the SMS message. The software may be a part of an operating system on the SIM card or an application on the SIM card SIC.

In a connection opening step CONOPEN, the SIM card SIC requests the mobile phone MP to establish a connection with the content server SERV via the GPRS based network IPNET. To that effect, the SIM card (SIC) for example, can use the received destination data and the data defining the specific port of the server SERV.

Once the connection is established, the content server SERV can load data or applications into the SIM card SIC via the GPRS based network.

Thus in summary, the content server SERV uses the GSM network GSMNET to instruct the mobile phone MP to establish a connection via the GPRS based network. Consequently, the server (SERV) takes the initiative to manage data, applications or other entities in the SIM card (SIC).

The communication between the mobile phone MP and the SIM card SIC can be made using, for example, the 3GPP TS 11.14 protocol and the 3GPP TS 31.111 protocol. The communication between the mobile phone MP and the content server SERV can be made using, for example, the 3GPP TS 03.60 protocol.

The description hereinbefore illustrates the following features:

A method of managing a communication device (MP) being arranged to communicate with a server (SERV) via a first communication network (GSMNET) and a second communication network (IPNET) characterised in that the method comprises the following step:
   an instruction step, in which the server (SERV) sends a management-request instruction to the communication device (MP) via the first communication network and;
   an executing step, in which the communication device (MP) executes the management-request instruction which causes the communication device (MP) to request the server (SERV) to effect an operation in the communication device (MP) via the second communication network (IPNEI).

There are various manners to implement the invention. The GPRS based network IPNET can also be a UMTS (Universal Mobile Telecommunication System), a wireless LAN (Local Area Network) network or more generally any IP (internet protocol) based network. An IP based network is a network which uses IP (Internet Protocol). We can also use the Bluetooth or the IrDA (InfraRedAssociationData).

There can also be more than one IP based network. For example, we can have both a GPRS based network and a UMTS based network.

There can also be more than one content server SERV. We could have, for example, a first content server that causes the mobile phone to establish a communication with a second content server.

Not only can we use a mobile phone MP with a SIM card SIC, but also a mobile phone MP alone, a PDA (personal digital assistant) or any other communication device capable of communicating with the above mentioned networks.

The server (SERV) can be any remote device capable of managing the communication device (MP) via a communication network.

The invention claimed is:
1. A communication device comprising:
   a subscriber identity module,
   wherein the communication device is configured to communicate with a server via a first wireless communication network and a second wireless communication network, wherein the communication device comprises functionality to:
   receive a subscriber identity module management-request instruction from the server via the first wireless communication network, and
   deliver the subscriber identity module management-request to the subscriber identity module,
   wherein the subscriber identity module comprises software to execute the subscriber identity module management-request instruction, and
   wherein the communication device automatically requests the server to effect a content downloading operation into the subscriber identity module over the second wireless communication network in response to the execution of the subscriber identity module management-request instruction.

2. The communication device of claim 1, wherein the first and the second communication networks are wireless communication networks.

3. The communication device according to claim 1, wherein the first communication network is a Global System for Mobile (GSM) network and the second communication network is a General Packet Radio Services (GPRS) based network.

4. The communication device according to claim 3, wherein the management request instruction is sent using Short Message Services.

5. The communication device according to claim 4, wherein the Short Messages Services are encrypted using a security protocol.

6. A computer readable medium having encoded thereon a computer program product for a subscriber identity module inserted in a communication device configured to communicate with a server via a first wireless communication network and a second wireless communication network, the program, when executed, is configured to enable the communication device to:
   receive a subscriber identity module management-request instruction from the server via the first wireless communication network, and deliver the subscriber identity module management-request instruction to the subscriber identity module,
   wherein the computer program product comprises instructions for executing the subscriber identity module management-request instruction, and
   wherein the communication device automatically requests the server to effect a content downloading operation into the subscriber identity module via the second wireless communication network in response to the execution of the subscriber identity module management-request instruction.

7. The computer readable medium in accordance with claim 6, wherein the first and the second communication networks are wireless communication networks.

8. A subscriber identity module to be inserted in a communication device, the communication device being configured to communicate with a server via a first wireless communication network and a second wireless communication network, wherein the communication device comprises functionality to receive a subscriber identity module management-request instruction from the server via the first wireless communication network, and the subscriber identity module being arranged to perform the following steps:

an instruction receiving step wherein the subscriber identity module receives from the communication device the subscriber identity module management-request instruction;

an executing step wherein the subscriber identity module automatically executes the subscriber identity module management-request instruction which causes the communication device to request the server to effect a content downloading operation into the subscriber identity module via the second wireless communication network.

9. The integrated circuit of claim 8, wherein the first and the second communication networks are wireless communication networks.

* * * * *